United States Patent
Lee et al.

(10) Patent No.: US 10,162,680 B2
(45) Date of Patent: Dec. 25, 2018

(54) CONTROL OF DATA EXCHANGE BETWEEN A PRIMARY CORE AND A SECONDARY CORE USING A FREEZE PROCESS FLAG AND A DATA FROZEN FLAG IN REAL-TIME

(71) Applicant: GM GLOBAL TECHNOLOGY OPERATIONS LLC, Detroit, MI (US)

(72) Inventors: Young Joo Lee, Rochester, MI (US); Daniel J. Berry, Macomb Township, MI (US); Brian A. Welchko, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 120 days.

(21) Appl. No.: 15/376,730

(22) Filed: Dec. 13, 2016

(65) Prior Publication Data

US 2018/0165127 A1     Jun. 14, 2018

(51) Int. Cl.
| | |
|---|---|
| G06F 9/50 | (2006.01) |
| G06F 9/48 | (2006.01) |
| B60K 6/26 | (2007.10) |
| G05B 15/02 | (2006.01) |
| B60W 10/08 | (2006.01) |

(52) U.S. Cl.
CPC ............... *G06F 9/505* (2013.01); *B60K 6/26* (2013.01); *B60W 10/08* (2013.01); *G05B 15/02* (2013.01); *G06F 9/485* (2013.01)

(58) Field of Classification Search
None
See application file for complete search history.

(56) References Cited

U.S. PATENT DOCUMENTS

| | | | | |
|---|---|---|---|---|
| 6,347,368 B1 * | 2/2002 | Harthcock | .......... | G06F 11/3636 712/225 |
| 7,254,815 B2 * | 8/2007 | Laschkewitsch | ....... | G06F 9/542 709/202 |

(Continued)

OTHER PUBLICATIONS

Kanehagi et al, Parallelization of Automotive Engine Control Software on Embedded Multi-core Processor Using OSCAR Compiler, 2013, IEEE, COOL Chips XVI, pp. 1-3 (Year: 2013).*

(Continued)

*Primary Examiner* — Abu Ghaffari
(74) *Attorney, Agent, or Firm* — Quinn IP Law

(57) ABSTRACT

A method of exchanging data in a real-time operating system, between a primary core and a secondary core in a multi-core processor, includes executing a primary path via the primary core and executing a secondary path via the secondary core. The primary path is configured to be a relatively faster processing task and the secondary path is configured to be a relatively slower processing task. The method includes devising a freeze in process flag to have a respective flag status set and cleared by the primary path. The method includes devising a data frozen flag to have a respective flag status set and cleared by both the primary and the secondary paths. A component that is operatively connected to the multi-core processor may be controlled based at least partially on a difference between primary and secondary sets of calculations executed by the primary and secondary cores, respectively.

20 Claims, 2 Drawing Sheets

(56) References Cited

U.S. PATENT DOCUMENTS

| | | | | |
|---|---|---|---|---|
| 7,487,215 B2* | 2/2009 | Magee | ............... | G06Q 10/107 |
| | | | | 358/1.15 |
| 7,925,861 B2* | 4/2011 | Stuttard | ............... | G06F 9/3001 |
| | | | | 712/16 |
| 8,234,035 B2* | 7/2012 | Iwagami | ............... | G05B 9/02 |
| | | | | 701/1 |
| 8,291,716 B2* | 10/2012 | Foster | ............... | F02C 6/18 |
| | | | | 60/788 |
| 8,904,050 B1* | 12/2014 | Raizen | ............... | G06F 3/0635 |
| | | | | 370/463 |
| 9,740,999 B2* | 8/2017 | Rivere | ............ | G06Q 10/06311 |
| 9,817,601 B1* | 11/2017 | Zhang | ............... | G06F 3/0634 |
| 2006/0047989 A1* | 3/2006 | Delgado | ............... | G06F 1/12 |
| | | | | 713/375 |
| 2007/0106878 A1* | 5/2007 | Nguyen | ............ | G06F 9/30061 |
| | | | | 712/207 |
| 2007/0124037 A1* | 5/2007 | Moran | ............... | B60K 6/12 |
| | | | | 701/22 |
| 2008/0065858 A1* | 3/2008 | Zimmer | ............... | G06F 8/60 |
| | | | | 712/13 |
| 2009/0021203 A1* | 1/2009 | Claeys | ............... | B60K 6/52 |
| | | | | 318/452 |
| 2011/0237386 A1* | 9/2011 | Hirtt | ............... | G05B 19/404 |
| | | | | 477/3 |
| 2012/0159235 A1* | 6/2012 | Suganthi | ............ | G06F 11/2028 |
| | | | | 714/4.11 |
| 2013/0090745 A1* | 4/2013 | Frazer | ............... | G05B 15/02 |
| | | | | 700/12 |
| 2013/0247046 A1* | 9/2013 | Asai | ............... | G06F 9/44594 |
| | | | | 718/1 |
| 2014/0129811 A1* | 5/2014 | Yamauchi | ............ | G06F 11/3409 |
| | | | | 712/227 |
| 2015/0253756 A1* | 9/2015 | Kudo | ............... | G05B 19/0421 |
| | | | | 700/86 |
| 2015/0286544 A1* | 10/2015 | Kadri | ............... | G06F 11/2043 |
| | | | | 714/13 |
| 2016/0034305 A1* | 2/2016 | Shear | ............... | G06F 9/50 |
| | | | | 707/722 |
| 2016/0236790 A1* | 8/2016 | Knapp | ............... | B64C 11/001 |

OTHER PUBLICATIONS

Sergaki et al, Efficiency Optimization of a Direct Torque Controlled Induction Motor used in Hybrid Electric Vehicles, 2011, IEEE, ACEMP—Electromotion 2011, pp. 1-6 (Year: 2011).*

* cited by examiner

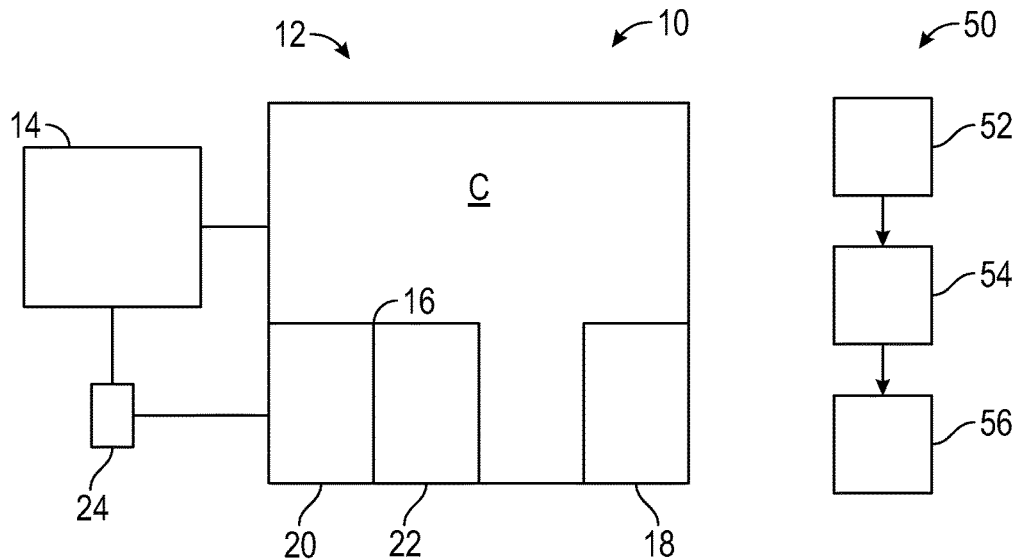
FIG. 1
FIG. 2
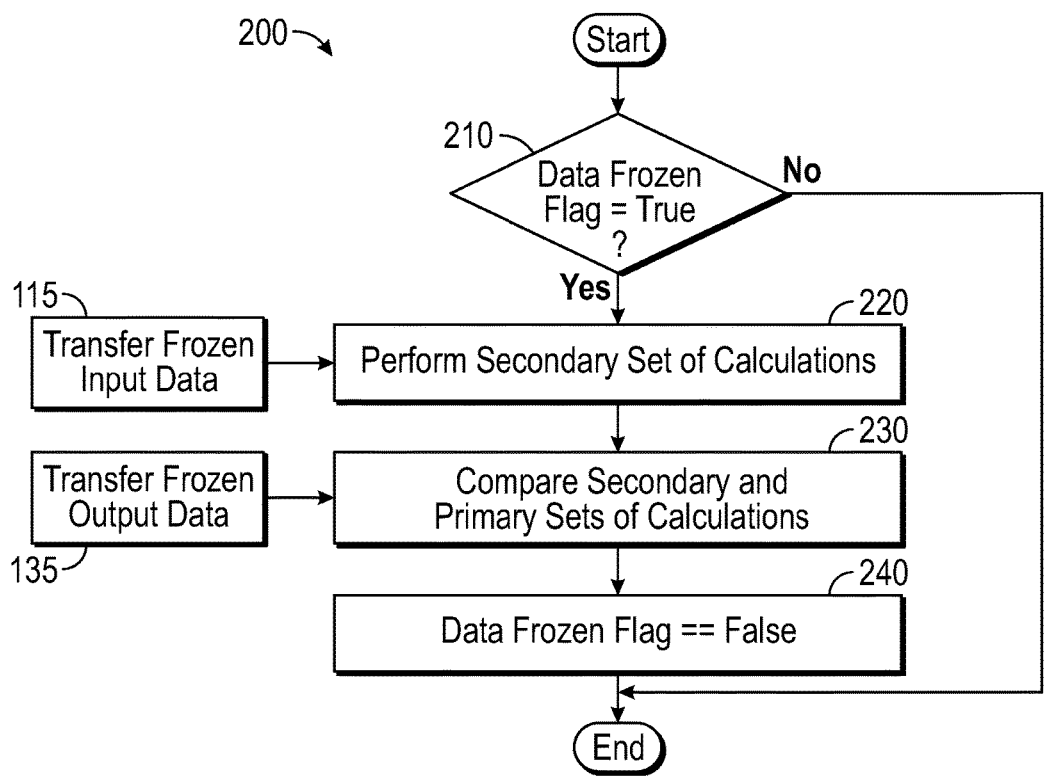
FIG. 3

US 10,162,680 B2

CONTROL OF DATA EXCHANGE BETWEEN A PRIMARY CORE AND A SECONDARY CORE USING A FREEZE PROCESS FLAG AND A DATA FROZEN FLAG IN REAL-TIME

INTRODUCTION

The present disclosure relates to a method of exchanging data in a real-time operating system between a primary core and a secondary core in a multi-core processor. A system may employ multiple cores or processors to execute respective interdependent paths at various processing speeds. The system may require an exchange or transfer of data between the respective paths.

SUMMARY

A method of exchanging data in a real-time operating system, between a primary core and a secondary core in a multi-core processor, includes executing a primary path via the primary core and executing a secondary path via the secondary core. The primary path is configured to be a relatively faster processing task and the secondary path is configured to be a relatively slower processing task. The method includes devising a freeze in process flag to have a respective flag status set and cleared by the primary path. The method includes devising a data frozen flag to have a respective flag status set and cleared by both the primary and the secondary paths. A component operatively connected to the multi-core processor may be controlled based at least partially on a difference between primary and secondary sets of calculations executed by the primary and secondary cores, respectively.

The method enables avoidance of false errors due to overlapping tasks in the system between the primary path (faster processing task) and the secondary path (slower processing task), wherein the slower processing task requires input data copied over or frozen from the faster processing task. The secondary path includes determining if the difference between the primary set of calculations executed by the primary core and the secondary set of calculations is at or below a threshold. The component may be adjusted if the difference is at or below the threshold. The component may include but is not limited to, an internal combustion engine or a hybrid electric propulsion system.

The primary path includes determining if an input data should be frozen based at least partially on the respective status of the data frozen flag and the freeze in process flag. The primary path includes performing a primary set of calculations on the input data to obtain an output data. The secondary path includes performing a secondary set of calculations on the input data based at least partially on the respective status of the data frozen flag. The secondary path requires a transfer of the input data from the primary core to the secondary core to perform the secondary set of calculations.

The method includes preventing the input data from being used in the secondary set of calculations, via the freeze in process flag and the data frozen flag, if the secondary path is executed during a period of time between said determining if the input data should be frozen and said performing the primary set of calculations.

Determining if the input data should be frozen based at least partially on the respective status of the data frozen flag and the freeze in process flag includes, if the respective status of both the data frozen flag and the freeze in process flag are false, then freezing the input data and setting the respective status of the freeze in process flag as true. The frozen input data may be transferred from the primary core to the secondary core. If the respective status of the data frozen flag is true, and the freeze in process flag is true, then the primary path will re-set the respective status of both the freeze in process flag and the data frozen flag as false.

The primary path includes determining if the output data is valid for comparison with the secondary set of calculations based at least partially on the respective flag status of the data frozen flag and the freeze in process flag. Determining if the output data is valid for comparison includes, if the respective status of the data frozen flag is false and the freeze in process flag is true, then freezing the output data and setting the respective status of the data frozen flag as true and the freeze in process flag as false. The frozen output data may be transferred from the primary core to the secondary core. If the respective status of both the freeze in process flag and the data frozen flag are true, then the primary path will re-set the respective status of both the freeze in process flag and the data frozen flag as false.

Performing the secondary set of calculations on the input data based at least partially on the respective status of the data frozen flag includes, if the respective status of the data frozen flag is true, performing the secondary set of calculations on the frozen input data, via the secondary core. The data frozen flag may be set as false thereafter.

A method of monitoring torque in a traction system having a multi-core processor and a component, the multi-core processor having a primary core and a secondary core, includes executing a primary path via the primary core and executing a secondary path via the secondary core. The primary path includes a primary set of calculations for obtaining an original set of torque values. The secondary path includes a secondary set of calculations for obtaining a redundant set of torque values. A component, such as an internal combustion engine or hybrid electric propulsion system, is operatively connected to the multi-core processor. The component may be adjusted if a difference between the primary set of calculations and the secondary set of calculations is at or below a threshold.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic diagram of a real-time operating system having a multi-core processor with a primary core and a secondary core;

FIG. 2 is a schematic flow diagram for a method of exchanging data between the primary core and the secondary core;

FIG. 3 is a schematic flow diagram of a secondary path executable by the secondary core.

DETAILED DESCRIPTION

Figure 4:
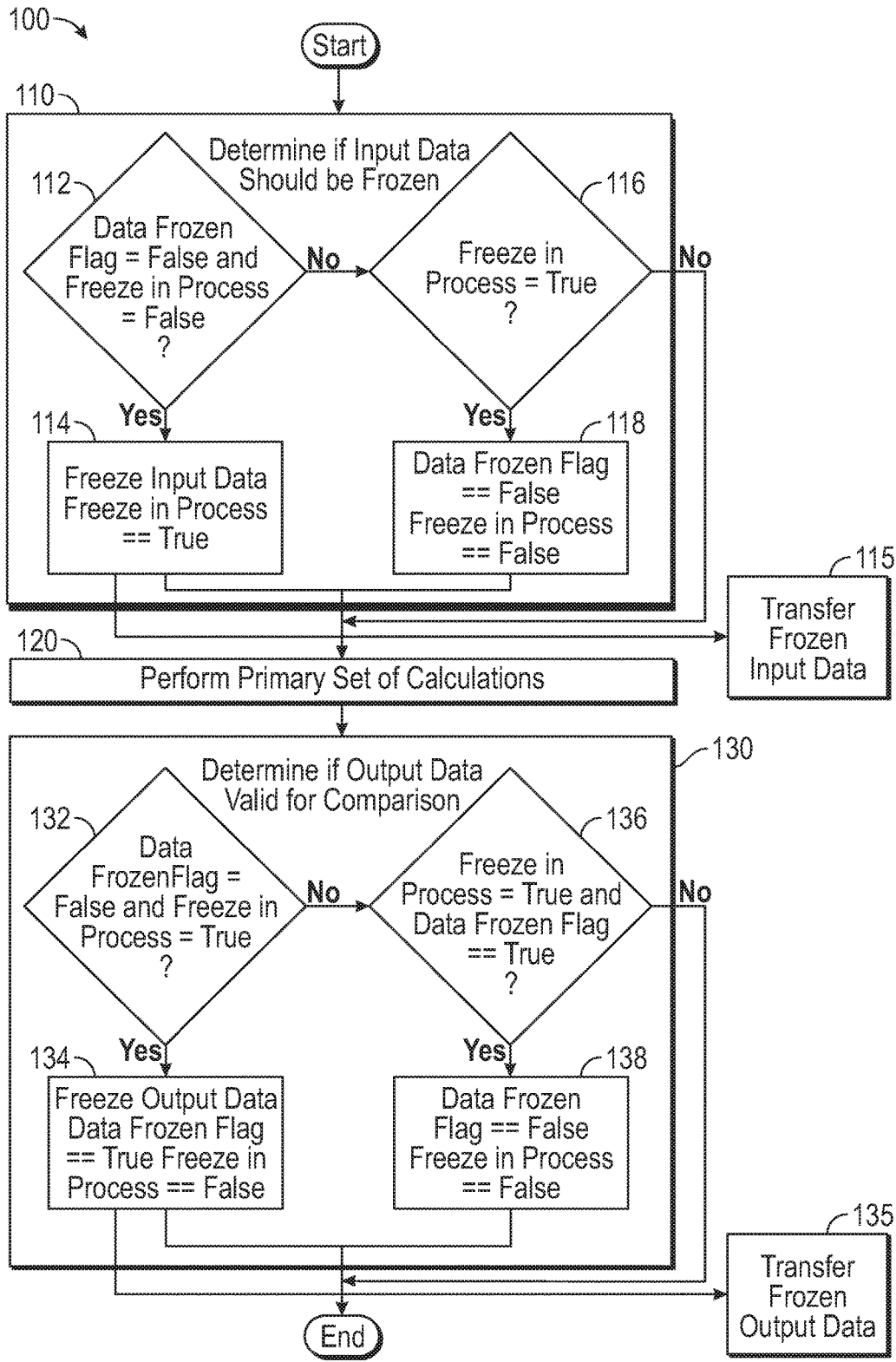
FIG. 4 is a schematic flow diagram of a primary path executable by the primary core.

Referring to the drawings, wherein like reference numbers refer to like components, FIG. 1 schematically illustrates a real-time operating system 10 which may be part of a device 12. The device 12 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or other transportation device. The device 12 may take many different forms and include multiple and/or alternate components and facilities.

Referring to FIG. 1, the system 10 includes a controller C operatively connected to a component 14, such as for example, an internal combustion engine. The controller C includes a multi-core processor 16 having at least two execution units, such as a primary core 20 and a secondary core 22. The primary core 20 and the secondary core 22 may be positioned side-by-side on a single integrated circuit. It is to be understood that other arrangements may be employed.

In the system 10, multiple different processing tasks may be executed in a near synchronous manner. As used herein, a "task" is a periodically executing computer code routine that is operative to perform one or more computational functions. Each task may include a plurality of computations that may be performed on data made available to the multi-core processor 16.

Referring to FIG. 1, the controller C includes at least one memory 18 (or non-transitory, tangible computer readable storage medium) on which are recorded instructions for executing a method 50 of exchanging data between the primary core 20 and the secondary core 22. The memory 18 can store controller-executable instruction sets, and the processor 16 can execute the controller-executable instruction sets stored in the memory 18. The controller C of FIG. 1 is specifically programmed to execute the method 50. The controller C (and execution of the method 50) improves the functioning of the device 12.

Referring to FIG. 2, a flowchart of the method 50 stored on and executable by the controller C of FIG. 1 is shown. Method 50 need not be applied in the specific order recited herein. Furthermore, it is to be understood that some blocks may be eliminated. Method 50 includes blocks 52, 54 and 56.

In block 52, the method 50 includes executing a primary path 100 (discussed in detail below with respect to FIG. 4) via the primary core 20 and executing a secondary path 200 (discussed in detail below with respect to FIG. 3) via the secondary core 22. The primary path 100 is configured to be a relatively faster processing task and the secondary path 200 is configured to be a relatively slower processing task. Method 50 may be used to avoid errors during an overlap of execution of the primary path 100 and the secondary path 200.

The component 14 may include but is not limited to, an internal combustion engine or hybrid electric propulsion system. In one embodiment, the primary path 100 involves primary torque calculations (i.e. for obtaining an original set of torque values) at a relatively faster rate and the secondary path 200 involves monitoring torque calculations (i.e. for obtaining a redundant set of torque values) at a relatively slower rate. The secondary core 22 requires input data copied over or frozen from the primary core 20 to perform monitoring or redundant torque calculations. The input data may be obtained via various sensors 24 operatively connected to the component 14. For example, the sensors 14 may include an engine speed sensor. The redundant torque calculations ensure operational integrity of the device 12.

The primary and secondary paths 100, 200 on the primary core 20 and the secondary core 22, respectively, require exclusive execution to prevent overlapping. The overlapped executions or overlapped tasks can create the partial skipping of primary data freezing tasks and lead to false errors in torque monitoring. For example, if the secondary path 200 of the secondary core 22 runs while the functions of the primary core 20 are in the process of completing, the primary core 20 will not freeze or copy over input data. However, the secondary path 200 will continue to calculate the redundant torque calculations using "old" frozen data. This causes a data coherence issue. As described below, the partial skipping of data freezing can be recovered, even while the primary path 100 and the secondary path 200 continue to be overlapped in execution, by employing two distinct flags.

Referring to block 54 of FIG. 2, the method 50 includes devising a freeze in process flag to have a respective status set and cleared by the primary path 100, and devising a data frozen flag to have a respective status set and cleared by both the primary path 100 and the secondary path 200. The data frozen flag being true represents a green light for the secondary core 22 to perform the secondary set of calculations. The secondary set of calculations is a redundant calculation on the input data. In other words, the secondary core 22 (in block 220 of FIG. 3) duplicates the calculations of the primary core 20 (in block 120 of FIG. 4). Conversely, the data frozen flag being false indicates that the secondary core 22 needs to hold off on performing the secondary set of calculations.

The freeze in process flag being true indicates that the primary path 100 is presently engaged in freezing the input data. Conversely, the freeze in process flag being false indicates that the primary path 100 is presently not engaged in freezing the input data. The freeze in process flag is set and cleared to ensure that if the secondary path 200 is executed during the period of time between blocks 110 and block 120 of the primary path 100, that input data set will not be used in the secondary set of calculations (block 220) and data will be collected in the next cycle or iteration of the primary path 100. Accordingly, the freeze in process flag preserves data coherence.

In block 56 of FIG. 2, the method 50 includes controlling or adjusting the component 14 if a difference between a primary set of calculations (obtained by the primary path 100) and the secondary set of calculations (obtained by the secondary path 200) is at or below a threshold.

FIGS. 3 and 4 may embody the present method 50 being used to avoid errors during an overlap of execution of the primary path 100 and the secondary path 200. Referring now to FIG. 4, an example flowchart of a primary path 100 is shown. In block 110 of FIG. 4, the primary path 100 determines if an input data should be frozen based at least partially on the respective status of the data frozen flag and the freeze in process flag. In block 120 of FIG. 4, the primary path 100 includes performing a primary set of calculations on the input data to obtain an output data. In block 130 of FIG. 4, the primary path 100 includes determining if the output data is valid for comparison with the secondary set of calculation, based at least partially on the respective flag status of the data frozen flag and the freeze in process flag.

As shown in FIG. 4, determining if the input data should be frozen in block 110 may include sub-blocks 112, 114, 116 and 118. Sub-block 112 includes determining whether the respective status of both the data frozen flag and the freeze in process flag are false. If so, the primary path 100 proceeds to sub-block 114, where the input data is frozen and the freeze in process flag is set as true. If not, the primary path 100 proceeds to sub-block 116 to determine if the freeze in process flag is true. If the freeze in process flag is true, the primary path 100 proceeds from sub-block 116 to sub-block 118, where the respective status of both the freeze in process flag and the data frozen flag are set as false. In block 115, the controller C is configured to transfer or copy over the frozen input data from the primary core 20 to the secondary core 22.

As shown in FIG. 4, block 130 (determining if the output data is valid for comparison with the secondary set of calculations) may include sub-blocks 132, 134, 136 and 138. In sub-block 132, the primary path 100 determines if the data frozen flag is false and the freeze in process flag is true. If so, the primary path 100 proceeds to sub-block 134. If not, the primary path 100 proceeds to sub-block 136. In sub-block 134, the output data is frozen, the respective status of the data frozen flag is set as true and the freeze in process flag is set as false. In sub-block 136, the primary path 100 determines if both the freeze in process flag and the data frozen flag are true. If so, the primary path 100 proceeds to sub-block 138, where the respective status of both the freeze in process flag and the data frozen flag are set as false. If not, the primary path 100 is ended. In block 135, the controller C is configured to transfer or copy over the frozen output data from the primary core 20 to the secondary core 22.

Referring now to FIG. 3, an example flowchart of a secondary path 200 is shown. In block 210 of FIG. 3, the secondary path 200 includes determining if the respective status of the data frozen flag is true. If the data frozen flag is true in block 210, the secondary path 200 proceeds to block 220, where the secondary core 22 will perform the secondary set of calculations on the input data, that is, repeat all of the calculations done by the primary core 20 using the frozen input data transferred in block 115 of FIGS. 3-4. The secondary path 200 requires the transfer of the input data (or copying over) from the primary core 20 to the secondary core 22 to perform the secondary set of calculations (see block 115 of FIGS. 3-4).

In block 230 of FIG. 3, the secondary path 200 includes comparing the primary set of calculations (from block 120 of FIG. 4) and the secondary set of calculations (from block 220 of FIG. 3). If the difference between the primary set of calculations (i.e., the output data) and the secondary set of calculations is at or below a threshold, the component 14 may be adjusted or otherwise controlled (see block 56). If the component 14 is an engine, the adjustment may include shifting to another predefined operating mode, displaying a "check engine" message on a user interface or other adjustment employed by those skilled in the art. In block 240 of FIG. 3, the secondary path 200 includes setting the respective status of the data frozen flag as false.

In summary, the method 50 enables avoidance of false errors due to overlapping tasks in the system 10 between the primary path 100 (faster processing task) and the secondary path 200 (slower processing task), wherein the slower processing task requires input data copied over or frozen from the faster processing task. The method 50 ensures data coherency, via the respective paths going through block 112 and block 132, shown in FIG. 4. Additionally, the respective paths that go through block 116 and block 136 carry out an error check on states that should not happen. If they do happen, everything is reset (via the data frozen flag and the freeze in process flag) and the cycle is repeated.

The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of exchanging data in real-time between a primary core and a secondary core in a multi-core processor, the multi-core processor being operatively connected to a component, the method comprising:

executing a primary execution path via the primary core and executing a secondary execution path via the secondary core, the primary execution path being configured to be a relatively faster processing of a task and the secondary execution path being configured to be a relatively slower processing of the task;

performing, via the primary execution path, a primary set of calculations on an input data to obtain a primary output data, the input data varying in real-time;

devising a freeze in process flag to have a respective status set and cleared by the primary execution path, the respective status of the freeze in process flag being set as true when the primary execution path is engaged in copying the input data and set as false when the primary execution path is not engaged in copying the input data;

devising a data frozen flag to have a respective status set and cleared by both the primary execution path and the secondary execution path, the respective status of the data frozen flag being set as true as a signal that the secondary core should begin the secondary execution path and set as false as the signal that the secondary core should delay executing the secondary execution path;

performing, via the secondary execution path, the secondary set of calculations on the input data based at least partially on the respective status of the data frozen flag to obtain a redundant output, the secondary execution path requiring a transfer of the input data from the primary core to the secondary core to perform the secondary set of calculations;

determining, via the primary execution path, if the input data should be copied or frozen based at least partially on the respective status of the data frozen flag and the freeze in process flag, including:
 if the respective status of both the data frozen flag and the freeze in process flag are false, then copying or freezing the input data and setting the respective status of the freeze in process flag as true, via the primary core, and transferring the frozen input data from the primary core to the secondary core;
 if the respective status of the data frozen flag is not false, and the freeze in process flag is true, then setting the respective status of both the freeze in process flag and the data frozen flag as false, via the primary core; and controlling the component based at least partially on a difference between the primary output data from the primary set of calculations executed by the primary core and the redundant output from the secondary set of calculations executed by the secondary core.

2. The method of claim 1, wherein:
controlling the component includes adjusting a mode of operation of the component if the difference between the primary output data from the primary set of calculations executed by the primary core and the redundant output from the secondary set of calculations is at or below a threshold.

3. The method of claim 1, further comprising:
preventing the input data from being used in the secondary set of calculations, via the freeze in process flag and the data frozen flag, if the secondary path execution is executed during a period of time between said determining if the input data should be frozen and said performing the primary set of calculations.

4. The method of claim 1, further comprising:
determining, via the primary execution path, if the primary output data from the primary set of calculations is ready for comparison with the redundant output from the secondary set of calculations based at least partially on the respective flag status of the data frozen flag and the freeze in process flag.

5. The method of claim 4, wherein said determining if the output data is ready for comparison includes:
 if the respective status of the data frozen flag is false and the freeze in process flag is true, then freezing the primary output data from the primary set of calculations and setting the respective status of the data frozen flag as true and the freeze in process flag as false, via the primary core;
 transferring the frozen primary output data from the primary core to the secondary core; and
 if the respective status of both the freeze in process flag and the data frozen flag are true, then setting the respective status of both the freeze in process flag and the data frozen flag as false, via the primary core.

6. The method of claim 1, wherein said performing the secondary set of calculations on the input data based at least partially on the respective status of the data frozen flag includes:
 if the respective status of the data frozen flag is true, performing the secondary set of calculations on the frozen input data, via the secondary core.

7. The method of claim 6, further comprising:
setting the respective status of the data frozen flag as false, via the secondary core, after performing the secondary set of calculations.

8. The method of claim 1, wherein the component is at least one of an internal combustion engine and a hybrid electric propulsion device.

9. The method of claim 8, wherein the task is the determination of a set of torque values for the component.

10. A system comprising:
a controller having a processor with at least two execution units, including a primary core and a secondary core configured to execute a primary execution path and a secondary execution path, respectively;
wherein the primary execution path is configured to be a relatively faster processing of a task and the secondary execution path is configured to be a relatively slower processing of the task;
a component operatively connected to the controller;
wherein the controller includes a tangible, non-transitory memory on which is recorded instructions, execution of the instructions by the processor causing the controller to:
 perform a primary set of calculations on an input data to obtain a primary output data, via the primary execution path, the input data varying in real-time;
 devise a freeze in process flag to have a respective status set and cleared by the primary execution path, the respective status of the freeze in process flag being set as true when the primary execution path is engaged in copying the input data and set as false when the primary execution path is not engaged in copying the input data;
 devise a data frozen flag to have a respective status set and cleared by both the primary execution path and the secondary execution path, the respective status of the data frozen flag being set as true as a signal that the secondary core should begin the secondary execution path and set as false as the signal that the secondary core should delay executing the secondary execution path;
 perform a secondary set of calculations on the input data based at least partially on the respective status of the data frozen flag to obtain a redundant output via the secondary execution path, the secondary execution path requiring a transfer of the input data from the primary core to the secondary core to perform the secondary set of calculations;
 determine, via the primary execution path, if the input data should be frozen based at least partially on the respective status of the data frozen flag and the freeze in process flag, including:
  if the respective status of both the data frozen flag and the freeze in process flag are false, then copying or freezing the input data and setting the respective status of the freeze in process flag as true, via the primary core, and transferring the frozen input data from the primary core to the secondary core;

if the respective status of the data frozen flag is not false, and the freeze in process flag is true, then setting the respective status of both the freeze in process flag and the data frozen flag as false, via the primary core; and control the component based at least partially on a difference between the primary output data from the primary set of calculations executed by the primary core and the redundant output from the secondary set of calculations executed by the secondary core.

11. The system of claim 10, wherein:

controlling the component includes adjusting a mode of operation of the component if the difference between the primary output data from the primary set of calculations executed by the primary core and the redundant output from the secondary set of calculations executed by the secondary core is at or below a threshold.

12. The system of claim 10, wherein the controller is programmed to:

prevent the input data from being used in the secondary set of calculations, via the freeze in process flag and the data frozen flag, if the secondary path is executed during a period of time between said determining if the input data should be frozen and said performing the primary set of calculations.

13. The system of claim 10, wherein the component is at least one of an internal combustion engine and a hybrid electric propulsion device.

14. The system of claim 10, wherein the task is the determination of a set of torque values for the component.

15. A method of monitoring torque in real-time in a traction system having a multi-core processor and a component, the multi-core processor having a primary core and a secondary core, the method comprising:

executing a primary execution path via the primary core, the primary path including a primary set of calculations for obtaining an original set of torque values, and executing a secondary execution path via the secondary core, the secondary execution path including a secondary set of calculations for obtaining a redundant set of torque values;

wherein the primary path is configured to be a relatively faster processing of a task and the secondary path is configured to be a relatively slower processing of the task;

devising a freeze in process flag to have a respective status set and cleared by the primary execution path, the respective status of the freeze in process flag being set as true when the primary execution path is engaged in copying the input data and set as false when the primary execution path is not engaged in copying the input data;

devising a data frozen flag to have a respective status set and cleared by both the primary execution path and the secondary execution path, the respective status of the data frozen flag being set as true as a signal that the secondary core should begin the secondary execution path and set as false as the signal that the secondary core should delay executing the secondary execution path;

performing, via the primary execution path, a primary set of calculations on an input data to obtain a primary output data, the input data varying in real-time;

performing, via the secondary execution path, the secondary set of calculations on the input data based at least partially on the respective status of the data frozen flag to obtain a redundant output, the secondary execution path requiring a transfer of the input data from the primary core to the secondary core to perform the secondary set of calculations;

based at least partially on the respective status of the data frozen flag and the freeze in process flag, including:

if the respective status of both the data frozen flag and the freeze in process flag are false, then copying or freezing the input data and setting the respective status of the freeze in process flag as true, via the primary core, and transferring the frozen input data from the primary core to the secondary core; and if the respective status of the data frozen flag is not false, and the freeze in process flag is true, then setting the respective status of both the freeze in process flag and the data frozen flag as false, via the primary core; and controlling the component if a difference between the primary output data from the primary set of calculations and the redundant output from the secondary set of calculations is at or below a threshold.

16. The method of claim 15, further comprising:

preventing the input data from being used in the secondary set of calculations, via the freeze in process flag and the data frozen flag, if the secondary path is executed during a period of time between said determining if the input data should be frozen and said performing the primary set of calculations.

17. The method of claim 15, further comprising:

determining, via the primary path, if the output data is ready for comparison with the secondary set of calculations based at least partially on the respective flag status of the data frozen flag and the freeze in process flag, including:

if the respective status of the data frozen flag is false and the freeze in process flag is true, then freezing the output data and setting the respective status of the data frozen flag as true and the freeze in process flag as false, via the primary core;

transferring the frozen output data from the primary core to the secondary core; and if the respective status of both the freeze in process flag and the data frozen flag are true, then setting the respective status of both the freeze in process flag and the data frozen flag as false, via the primary core.

18. The method of claim 15, further comprising:

setting the respective status of the data frozen flag as false, via the secondary core, after performing the secondary set of calculations; and wherein said performing the secondary set of calculations on the input data based at least partially on the respective status of the data frozen flag includes, if the respective status of the data frozen flag is true, performing the secondary set of calculations on the frozen input data, via the secondary core.

19. The method of claim 15, wherein the component is at least one of an internal combustion engine and a hybrid electric propulsion device.

20. The method of claim 15, wherein the task is the determination of a set of torque values for the component.

* * * * *